(12) United States Patent
Vollmer et al.

(10) Patent No.: US 6,512,779 B1
(45) Date of Patent: Jan. 28, 2003

(54) DEVICE FOR DATA TRANSMISSION

(75) Inventors: Vasco Vollmer, Gartow (DE); Markus Radimirsch, Laatzen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/453,265

(22) Filed: Dec. 2, 1999

(30) Foreign Application Priority Data

Dec. 4, 1998 (DE) .......................... 198 56 043

(51) Int. Cl.[7] .................................................. H04J 3/16
(52) U.S. Cl. .................. 370/470; 370/528; 370/460; 455/434; 455/466
(58) Field of Search ................................ 370/470, 528, 370/460; 455/434, 466

(56) References Cited

U.S. PATENT DOCUMENTS 6,252,868 B1 * 6/2001 Diachina et al. ............ 370/347

FOREIGN PATENT DOCUMENTS

DE 197 26 120 A1 12/1998

OTHER PUBLICATIONS

D. Petras, A.Kraemling " Mac Protocol with Polling and Fast Collision Resolution for an ATM Interfsce" IEEE ATM Workshop,San Francisco, CA. Aug. 1996.
D. Petras, A. Kraemling "MAC Protocol for Wireless ATM Contention Free Versus Contention Based Transmission of Reservation Requests", PIMRC 96, Taipei, Taiwan, Oct. 1996.

* cited by examiner

Primary Examiner—Doris H. To
(74) Attorney, Agent, or Firm—Michael J. Striker

(57) ABSTRACT

The device for data transmission has a main station (3) and a number of terminals (1) and is provided with a device for coordinating operation in respective signaling data phases for downlink (42) and uplink (52) and corresponding useful signal data phases (41, 51). Each transmission frame (5) has a first data field (4211) that is fixed in length and is for required, time-critical, data and at least one other data field (4212) which is flexible in length and for only sporadically required data using various information elements (6), such as announcements of frequency changes, status information, additions to manufacture-specific information, warnings and/or information regarding the capabilities of the main station.

5 Claims, 4 Drawing Sheets

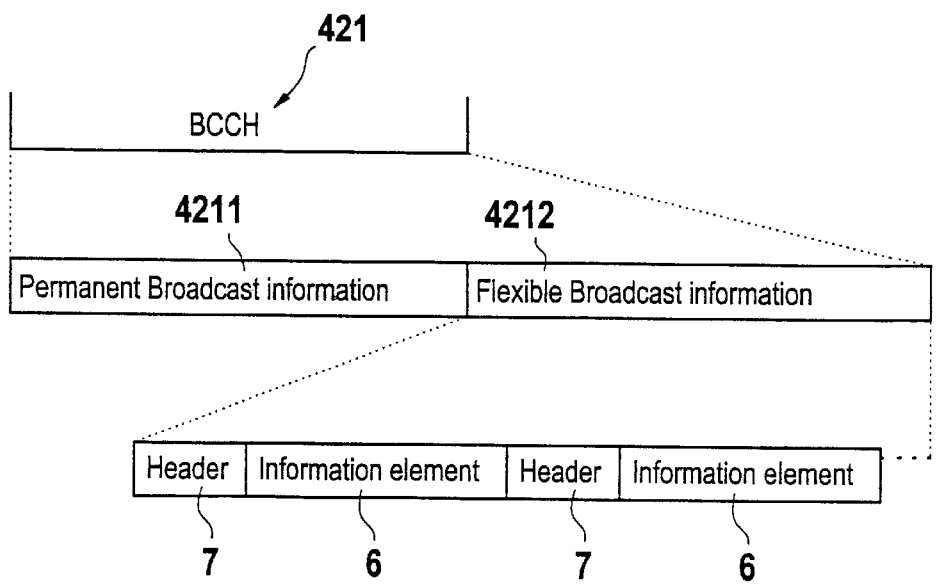

Fig. 5

| (ID) | | | |
|---|---|---|---|
| 0 | Efg | | |
| 1 | Abc | | |
| 2 | Mno | | |
| 3 | Xyz | | |
| 4 | Uvw | | |
| ... | ... | | |

Fig. 6

| ID | Info | Data | ID | Info | Data | ID | Info | Data | ID | Info | Data | ID | Info | Data | ID | Info | Data | ID | Info | Data |
|---|---|---|---|---|---|---|---|---|---|---|---|---|---|---|---|---|---|---|---|---|
| 1 | abc | | 3 | xyz | | 2 | mno | | 0 | efg | | 3 | jkl | | 1 | rst | | 4 | uvw | |

DEVICE FOR DATA TRANSMISSION

BACKGROUND OF THE INVENTION

The present invention relates to a device for data transmission to a common communications medium comprising a main station and a plurality of subscribers, which is controllable by transmission of data packets from the main station to the subscribers (downlink) and from the subscribers to the main station (uplink). A method, which is based on one such device, has already been proposed in German Patent Application DE 197 26 120.5. There the main station performs coordinating operations for communications medium access by means of protocol-oriented transmission frames, with signaling periods designated therein. In these transmission frames respective signaling data phases are provided for the uplink and downlink as well as the useful signal data phases.

In centrally controlled mobile radio communication systems, such as GSM, a transmission from the central base station to the reachable subscriber terminals is necessary, during which relevant information is transmitted for all mobile subscribers. Furthermore this information includes the capabilities of the base station, the used frequencies, information relating to sleep mode as well as much other information. This type of information is frequently collected in one logical channel. It is designated as broadcast channel BCH in GSM or the ETSI project HIPERLAN or also as downlink signaling.

In one such communication system one or more subscriber terminals exchange data packets with each other or with the main station by means of a common channel.

Possible communications media include a radio channel, a passive optical network with simple optical splitters and a cable distributive network with coaxial cables and/or glass fibers. The principal is illustrated in FIG. 1. A concentrator with several terminals may replace a single terminal unit (private branch exchange a network unit owned by the operating company). In the following the generality of the terminals is stated without limitation. The subscriber or their terminal is designated with 1, the common transmission medium with 2, the main station with 3 and the transmission network with 4.

The following embodiments were developed for use in ATM networks, but can also be used in other networks, such as IP (internet protocol) or ether networks.

In a centrally controlled communication system it is necessary to build a structure into the medium, which permits the terminals to be synchronized to the main station. Furthermore in central control the main station must administer the commonly used medium and assign or refer to the respective terminal. For that purpose medium access protocols (Medium access control, MAC) are suitable. These medium access protocols are described in D. Petras, A. Krämling, "MAC Protocol with Polling and Fast Collision Resolution for an ATM Air Interface", IEEE ATM Workshop, San Franciso, Calif., August 1996, and in D. Petras, A. Krämling, A. Hettich, "MAC Protocol for Wireless ATM Contention Free Versus Contention Based Transmission of Reservation Requests", PIMRC '96, Taipei, Taiwan, October 1996.

SUMMARY OF THE INVENTION

It is an object of the present invention to provided an improved more efficient device for data transmission of the above-described kind.

The device with the features of the invention allows an efficient information transmission, especially in the signaling data phase for the downlink (broadcast channel). Data that must be transmitted in each transmission frame, can be separated from data which must be only sporadically or only seldom available by distributing the data into two different types of data fields. For the latter type of data the data field is not assigned certain fixed types of information, but can be used for different information elements from the main station as required. Because of that feature a widely variable data rate is available for various information elements.

In order to identify the type of information elements they are provided with a header for identification purposes. Possible content of the information elements include, e.g., announcements of frequency changes, information regarding terminals in the sleep mode, status information, additions to manufacture-specific information or information regarding the capabilities of the main station.

A flexible adjustment and/or expansion to future requirements is possible by means of the division of the data fields according to the invention. It is also possible to transmit hardly any information in the second data field and e.g. to perform measurements of the radio background during this time.

In contrast to the situation in the prior art, according to the invention space does not need to be provided in each transmission frame for information that is not continuously required. Furthermore in the solutions according to the prior art expandability is only possible by reservation of additional data capacity.

BRIEF DESCRIPTION OF THE DRAWING

The objects, features and advantages of the invention will now be illustrated in more detail with the aid of the following description of the preferred embodiments, with reference to the accompanying figures in which:

FIG. 3 is a table showing the meaning of abbreviations used herein;

FIG. 4 is a diagram showing the division of the signaling data phase for the downlink;

FIG. 5 is a list of different information types, and

FIG. 6 is a diagram showing several successive transmission frames.

DESCRIPTION OF THE PREFERRED EMBODIMENTS

Figure 1:
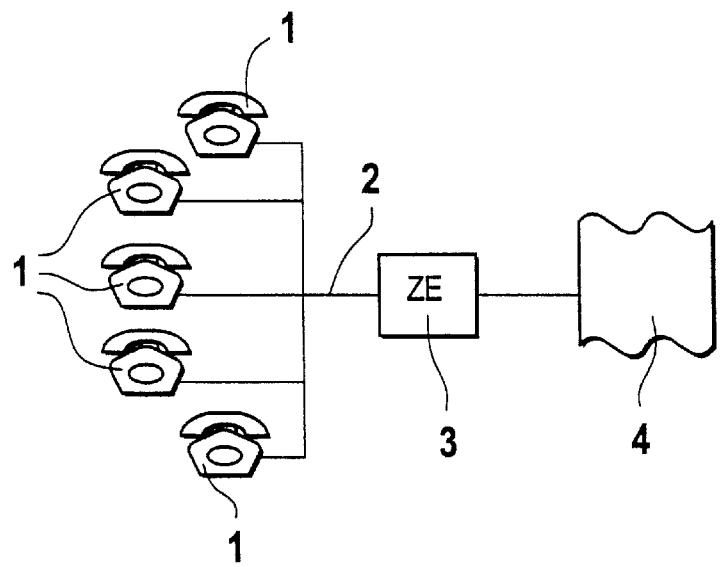
FIG. 1 is a diagrammatic view of a currently known data transmission device.
Figure 2:
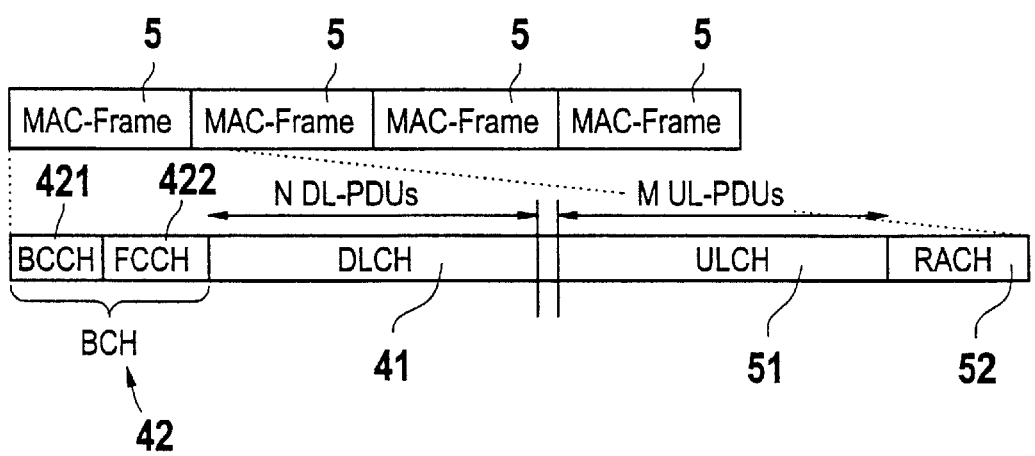
FIG. 2 is a diagram showing the basic structure of a MAC transmission frame.

The structure of a transmission frame, for example the communications network shown in FIG. 1, is illustrated in FIG. 2. The transmission frames 5 are designated here as MAC frames, in contrast to the frames shown in the above mentioned prior art references by D. Petras, et al, where they are designated with signaling periods. The downlink signaling data phase 42, BCH (broadcast channel), appears at the beginning of a transmission frame 5. The useful signal data phase 41 for the downlink adjoins or follows that. It is designated with DLCH (downlink channel) and comprises N-useful data time slots for the DL-PDUs (downlink protocol data units). M-useful data time slots for the UL-PDUs (uplink protocol data units) are similarly provided for the useful signal data phase 51 of the uplink ULCH (uplink channel). The uplink signaling data phase 52 is designated with RACH (random access channel).

The abbreviations used for a transmission frame are summarized in the table shown in FIG. 3.

The downlink signaling data phase BCH is, as shown in FIG. 2, divided into two categories, namely into a signaling data phase 421, BCCH (broadcast control channel), and a protocol-related signaling data phase 422, FCCH (frame control channel). In BCCH 421 the main station 3 can send information to the terminals 1, which is rather of global relevance for the main station 3 and the communication with the terminals 1. This information can include the capabilities of the main station, manufacturer information, actual operating modes and the address of the main station. In contrast, the FCCH 422 defines the structure and content of the rest of the transmission frame 5 (MAC frame). Thus the FCCH has a rather local significance related to the MAC frame.

According to the invention now the BCCH 421 according to FIG. 2 is divided into two types of data fields 4211 and 4212. As FIG. 4 shows, one field is integrated, that means it serves for broadcast information, which must not be transmitted in each frame, to be sent in an arbitrary sequence. The first data field 4211 transmits permanent broadcast information to be transmitted. The format and the length of this field is fixed. A second data field 4212 contains flexible broadcast information. It contains one or more information elements 6, which can be fixed in length or variable in length. Each information element 6 is preceded by a header 7, which is associated with or belongs to this information element 6. The header 7 contains an identifier 8, which describes the type of following information elements 6. In case the information elements 6 have different lengths, information regarding this length is provided as a component of the header 7.

Because the content of each frame can be changed, a high degree of flexibility is produced for the resulting data rate of the individual information type. Thus the resulting data rate for an information type is freely selectable from 0 bit/s to 16 kbit/s in an incoming channel with a frame length of a millisecond and an information field size of 2 bytes.

A further decisive advantage results because this data field 4212 can be used for future expansion by simply expanding the header 7 to be defined. This is possible in the current state of the art only for forseen applications by providing unused bits and is entirely impossible for unforseen possible applications.

The different information to be transmitted must be sorted into both parts of the BCCH 421. Information for the fixed part of the BCCH, data field 4211, includes all data which must be available in each frame, e.g. information regarding the position of the RACH, or time critical information, which the terminal requires very rapidly, e.g. in hand-over. Here especially information should be named, which must be received when scanning a neighboring main station. Information for the flexible part, data field 4212, includes all data, which must be entered only sporadically or is not usually required in each frame. Here a few examples are pointed out in the following exemplary application. This application is simplified because only one information element 6 is transmitted in each flexible data field 4212. Examples for the content of the flexible data field 4212 are information entities that must be only seldom available or sporadically at the terminals. Other examples for the flexible data field 4212 preferably include data that changes only slowly or not at all or that is not time critical. Information categories of this sort include: announcements of frequency changes (sporadic), additions to manufacture-specific information (seldom, standard), capabilities and properties of the main station (seldom, standard), alarm signals regarding faulty operation (sporadic).

Figure 5:
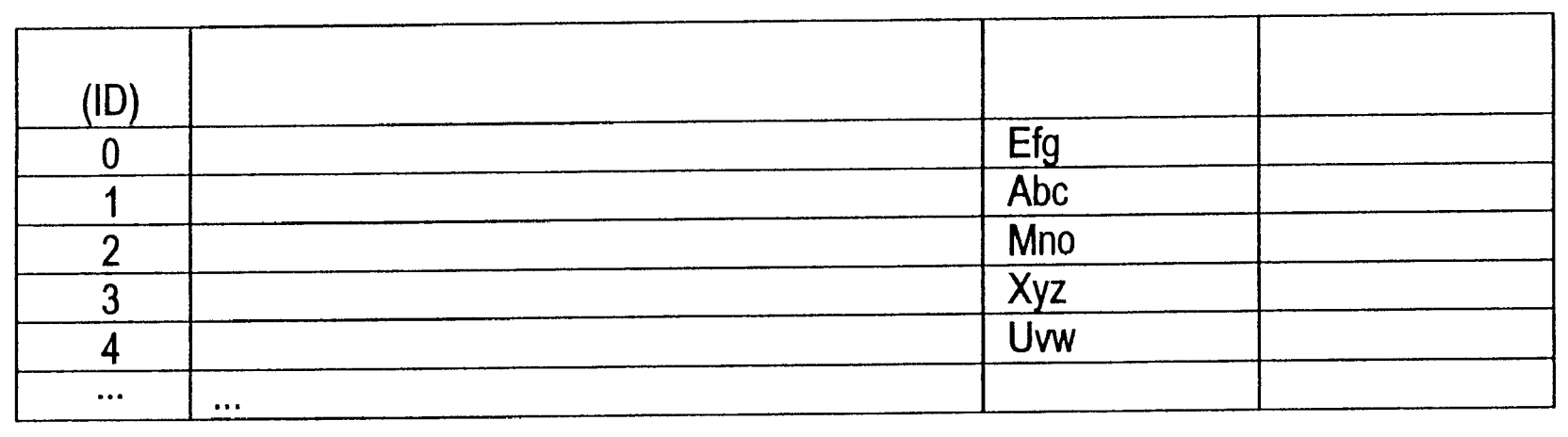

Each type of information is assigned an identifier 8 in header 7. FIG. 5 is a list of the different types of information and their occurrence in the transmission frame. The structure shown in FIG. 6 thus results for seven successive frames. The useful data DLCH of the downlink are contained in the data field, or the protocol related data of the FCCH 422 shown in FIG. 2.

The disclosure in German Patent Application 198 56 043.5 of Dec. 4, 1998 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a device for data transmission, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:
1. A device for data transmission in a common communications medium, said device comprising a main station (3) and a plurality of terminals (1) as well as means for controlling the data transmission by transmitting data packets from the main station (3) to the terminals (1) and from the terminals (1) to the main station (3);

wherein the main station (3) includes means for coordinating operation for medium access by means of protocol-oriented transmission frames (6) having respective signaling data phases for downlink (42) and uplink (52) and corresponding useful signal data phases (41, 51);

wherein said signaling data phase for said downlink (42) is divided into at least two types of data fields (4211, 4212), a first of said at least two types of said data fields being provided permanently in each of said transmission frames (5) and a second of said at least two types of said data fields having a variable length and containing one or more different information elements (6);

wherein said information elements (6) include only sporadically required, non-critical data and said sporadically required, non-critical data include at least one of announcements of frequency changes, status information, additions to manufacture-specific information, warnings and information regarding the capabilities of the main station; and wherein said first of said at least two types of said data fields contains information that must be available in each of said transmission data frames (5) and is time-critical.

2. The device as defined in claim 1, wherein said first of said at least two types of said data fields is fixed in format and length and said variable length of said second of said at least two types of said data fields is chosen according to transmission requirements.

3. The device as defined in claim 1, wherein said one or more different information elements (6) is or are fixed or variable in length.

4. The device as defined in claim 1, wherein said second of said at least two types of said data fields Includes a respective header (7) preceding each of said one or more different information elements (6) and said respective header (7) includes descriptive data describing the corresponding following information elements (6).

5. The device as defined in claim 4, wherein said descriptive data in said respective headers specifies respective lengths of the corresponding following information elements (6).

* * * * *